US012793394B2

(12) United States Patent
Pandarinath et al.

(10) Patent No.: US 12,793,394 B2
(45) Date of Patent: Nov. 10, 2026

(54) SELECTIVE BACKPROPAGATION THROUGH TIME

(71) Applicants: Emory University, Atlanta, GA (US); The University of Chicago, Chicago, IL (US); Georgia Tech Research Corporation, Atlanta, GA (US); The University of North Carolina at Chapel Hill, Chapel Hill, NC (US)

(72) Inventors: Chethan Pandarinath, Decatur, GA (US); Feng Zhu, Atlanta, GA (US); Matthew Tyler Kaufman, Chicago, IL (US); Andrew Robert Sedler, Atlanta, GA (US); Andrea Giovannucci, Chapel Hill, NC (US)

(73) Assignees: Emory University, Atlanta, GA (US); The University of Chicago, Chicago, IL (US); Georgia Tech Research Corporation, Atlanta, GA (US); The University of North Carolina at Chapel Hill, Chapel Hill, NC (US)

( * ) Notice: Subject to any disclaimer, the term of this patent is extended or adjusted under 35 U.S.C. 154(b) by 251 days.

(21) Appl. No.: 18/702,797

(22) PCT Filed: Oct. 19, 2022

(86) PCT No.: PCT/US2022/078338
§ 371 (c)(1),
(2) Date: Apr. 18, 2024

(87) PCT Pub. No.: WO2023/069973
PCT Pub. Date: Apr. 27, 2023

(65) Prior Publication Data
US 2025/0245971 A1 Jul. 31, 2025

Related U.S. Application Data

(60) Provisional application No. 63/262,704, filed on Oct. 19, 2021.

(51) Int. Cl.
*G06V 10/774* (2022.01)
*G06V 10/82* (2022.01)

(52) U.S. Cl.
CPC ........... *G06V 10/774* (2022.01); *G06V 10/82* (2022.01)

(58) Field of Classification Search
CPC .... G06V 10/774; G06V 10/82; G06N 3/0455; G06N 3/084; G06N 3/044
See application file for complete search history.

(56) References Cited

U.S. PATENT DOCUMENTS

2017/0024642 A1 1/2017 Xiong et al.
2017/0091619 A1 3/2017 Towal et al.
(Continued)

FOREIGN PATENT DOCUMENTS

WO WO 2018/184204 A2 10/2018
WO WO 2020/097217 A1 5/2020

OTHER PUBLICATIONS

Bahadori et al. "Temporal-Clustering Invariance in Irregular Healthcare Time Series." arXiv. 2019; preprint arXiv:1904.12206.
(Continued)

*Primary Examiner* — John B Strege
*Assistant Examiner* — Daniel C Chang
(74) *Attorney, Agent, or Firm* — Emory Patent Group

(57) ABSTRACT

The present disclosure provides novel training systems and methods for recurrent neural network models. One such method comprises obtaining a first sequence of sparse input data as training data; augmenting the first sequence of sparse input data by zero-filling missing input points; training the recurrent neural network model using the augmented sequence of sparse input data to obtain a trained recurrent neural network model, and applying new data as an input to the trained recurrent neural network model, wherein the new (Continued)

data comprises a second sequence of sparse input data to obtain a corresponding output data sequence.

20 Claims, 15 Drawing Sheets

(56) References Cited

U.S. PATENT DOCUMENTS

| | | | | |
|---|---|---|---|---|
| 2018/0357537 | A1* | 12/2018 | Munkberg | G06N 3/08 |
| 2020/0134461 | A1 | 4/2020 | Chai et al. | |
| 2020/0289011 | A1* | 9/2020 | Weingärtner | A61B 5/05 |
| 2021/0063964 | A1* | 3/2021 | Marshel | G03H 1/2294 |
| 2022/0198245 | A1* | 6/2022 | Cleland | G06N 3/0495 |

OTHER PUBLICATIONS

Gruslys et al. "Memory-Efficient Backpropagation Through Time." Advances in Neural Information Processing Systems. 2016; 29.
Hansen, DF. "Using Deep Neural Networks to Reconstruct Non-uniformly Sampled NMR Spectra." Journal of Biomolecular NMR. 2019; 73:577-585.
Lecoq et al. "Removing independent noise in systems neuroscience data using DeepInterpolation." Nature Methods. 2021; 18:1401-1408.
Nonnenmacher et al. "Extracting low-dimensional dynamics from multiple large-scale neural population recordings by learning to predict correlations." Advances in Neural Information Processing Systems. 2017; 30.
Pandarinath et al. "Inferring single-trial neural population dynamics using sequential auto-encoders." Nature Methods. 2018; 15:805-815.
Perveen et al. "Handling Irregularly Sampled Longitudinal Data and Prognostic Modeling of Diabetes Using Machine Learning Technique," IEEE Access. 2020; 8:21875-21885.
Rubanova et al. "Latent ordinary differential equations for irregularly-sampled time series." Advances in Neural Information Processing Systems. 2019; 32.
Xu et al. "Dynamic matrix recovery from incomplete observations under an exact low-rank constraint." arXiv. 2016; preprint arXiv:1610.09420.
Xu et al. "Simultaneous recovery of a series of low-rank matrices by locally weighted matrix smoothing," 2017 IEEE 7th International Workshop on Computational Advances in Multi-Sensor Adaptive Processing (CAMSAP). 2017; 1-5.
Zhu et al. "Deep inference of latent dynamics with spatio-temporal super-resolution using selective backpropagation through time." Advances in Neural Information Processing Systems. 2021; 34:2331-2345.
Zhu et al. "3-043. Precise inference of single trial network dynamics from calcium imaging using LFADS." Cosyne 2021: Computational and Systems Neuroscience Conference, Virtual. Feb. 23-26, 2021.
Zhu et al. "RADICaL: A deep learning framework for precise inference of network dynamics from calcium imaging." Poster session presented at: Cosyne 2021: Computational and Systems Neuroscience Conference, Virtual. Feb. 23-26, 2021.
Zhu et al. "A deep learning framework for inference of single-trial neural population dynamics from calcium imaging with subframe temporal resolution." Nature Neuroscience. 2022; 25:1724-1734.
International Search Report and Written Opinion for PCT Application No. PCT/US2022/078338 dated Jan. 19, 2023.

* cited by examiner

SELECTIVE BACKPROPAGATION THROUGH TIME

CROSS-REFERENCE TO RELATED APPLICATION

This application is the National Stage of International Application No. PCT/US2022/078338 filed Oct. 19, 2022, which claims the benefit of priority to U.S. Provisional Application No. 63/262,704 filed Oct. 19, 2021. The entirety of each of these applications is hereby incorporated by reference for all purposes.

STATEMENT REGARDING FEDERALLY SPONSORED RESEARCH OR DEVELOPMENT

This invention was made with government support under grant numbers U.S. Pat. Nos. 1,835,390 and 1,835,364 awarded by The National Science Foundation and under grant number HD073945 awarded by the National Institutes of Health. The government has certain rights in this invention.

TECHNICAL FIELD

The present disclosure is generally related to techniques for training neural networks.

BACKGROUND

Modern systems neuroscientists have access to the activity of many thousands to potentially millions of neurons via multi-photon calcium imaging and high-density silicon probes. Such interfaces provide a qualitatively different picture of brain activity than was achievable even a decade ago. However, neural interfaces increasingly face a trade-off, where the number of neurons that can be accessed (capacity) is often far greater than the number that is simultaneously monitored (bandwidth). For example, as represented in FIG. 1A, with 2-photon (2P) calcium imaging, hundreds to thousands of neurons are serially scanned by a laser that traverses the field of view, resulting in different neurons being sampled at different times within an imaging frame. As a consequence, a trade-off exists between the size of the field-of-view (and hence the number of neurons monitored), the sampling frequency, and the signal-to-noise with which each neuron is sampled. However, current analysis methods treat 2P data as if all neurons within a field-of-view were sampled at the same time at the imaging frame rate.

Electrophysiological (e-phys.) interfaces face similar trade-offs, as also represented in FIG. 1A. With groundbreaking high-density probes such as Neuropixels and Neuroseeker, simultaneous monitoring of all recording sites is either not currently possible or limits the signal-to-noise ratio, so users typically monitor a selected subset of sites within a given recording session. For example, Neuropixels 2.0 probes contain up to 5120 electrodes, 384 of which can be recorded simultaneously. In other situations, power constraints might make it preferable to restrict the number of channels that are simultaneously monitored, such as in wireless or fully-implanted applications where battery life and heat dissipation are key challenges. As newer interfacing strategies provide a pathway to hundreds of thousands of channels for revolutionary brain-machine interfaces, neural data processing strategies that can leverage dynamic deployment of recording bandwidth might allow substantial power savings. Solutions to these space-time trade-offs may come from the structure of neural activity itself to allow for inferring latent dynamics from sparse neural population activity data.

By analogy, many data acquisition technologies involve some form of "scanning," in which data from different sources are acquired sequentially and then the sequence is repeated. This includes technologies such as ultrasound imaging, magnetic resonance imaging, scanning cameras, and others. These technologies all must trade off the number of sources acquired (e.g., the number of pixels) with how frequently each is sampled.

SUMMARY

Embodiments of the present disclosure provide novel training systems and methods for recurrent neural network models. One such system comprises at least one computer processor and at least one non-transitory computer-readable storage medium storing instructions that, when executed by the at least one computer processor, causes the at least one computer processor to perform: obtaining a first sequence of sparse input data as training data; augmenting the first sequence of sparse input data by zero-filling missing input points; training the recurrent neural network model using the augmented sequence of sparse input data to obtain a trained recurrent neural network model, and applying new data as an input to the trained recurrent neural network model, wherein the new data comprises a second sequence of sparse input data to obtain a corresponding output data sequence.

The present disclosure can also be viewed as a novel training method. In this regard, one embodiment of such a method, among others, can be broadly summarized by obtaining, by at least one computer processor, a first sequence of sparse input data as training data; augmenting, by the at least one computer processor, the first sequence of sparse input data by zero-filling missing input points; training, by the at least one computer processor, the recurrent neural network model using the augmented sequence of sparse input data to obtain a trained recurrent neural network model, and applying, by the at least one computer processor, new data as an input to the trained recurrent neural network model, wherein the new data comprises a second sequence of sparse input data to obtain a corresponding output data sequence.

In one or more aspects for such systems and/or methods, training of the recurrent neural network model comprises updating values of a plurality of parameters of the recurrent neural network model via a selective backpropagation through time process; the selective backpropagation through time process comprises computing a reconstruction loss for observed data points in the first sequence of sparse input data and bypassing computing the reconstruction loss for missing data points in the first sequence of sparse input data; the first sequence of sparse input data and the second sequence of sparse input data comprise staggered samplings of data; the first sequence of sparse input data comprises 2-photon (2P) calcium imaging data; and/or the first sequence of sparse input data comprises electrophysiological recording data; and/or the first sequence of sparse input data comprises data from ultrasound imaging, and/or magnetic resonance imaging, and/or other scanning or temporally multiplexed system.

In one or more aspects, such systems and/or methods may further perform generating the output data sequence by reconstructing the output data sequence at observed data points of the second sequence of sparse input data and interpolating the output data sequence at unobserved data points of the second sequence of sparse input data; and/or pretraining the recurrent neural network model with input data that is more densely sampled.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

A variety of methods have been developed to infer latent dynamical structure from neural population activity on individual trials, including those based on Gaussian processes, linear and switching linear dynamical systems, and nonlinear dynamical systems such as recurrent neural network models, hidden Markov models, neural ordinary differential equations (ODEs), and transformers. Variants of these methods accommodate cases where the particular observed neurons change over long time periods (e.g., over the course of days), but these are not appropriate for cases where neurons are intermittently sampled on short timescales. As described below, several of these methods would be amenable to using a novel training process of the present disclosure for any neural network architecture that learns weights (e.g., parameters of a neural network) via backpropagation through time to adapt to intermittent sampling.

Figure 1A:
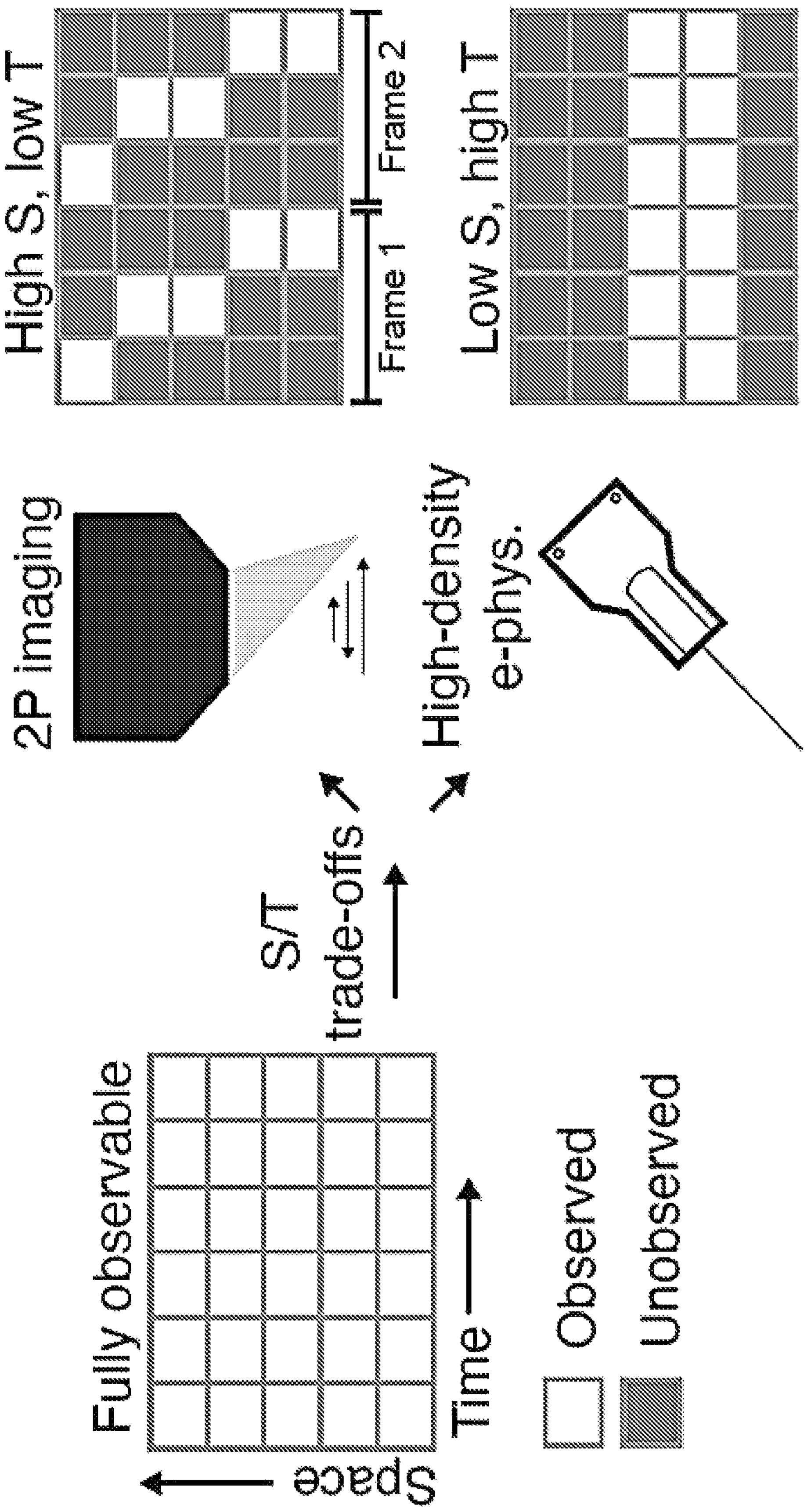
FIG. 1A shows space-time trade-offs in neural interfaces of 2-photon calcium imaging and electrophysiological recordings.
Figure 1B:
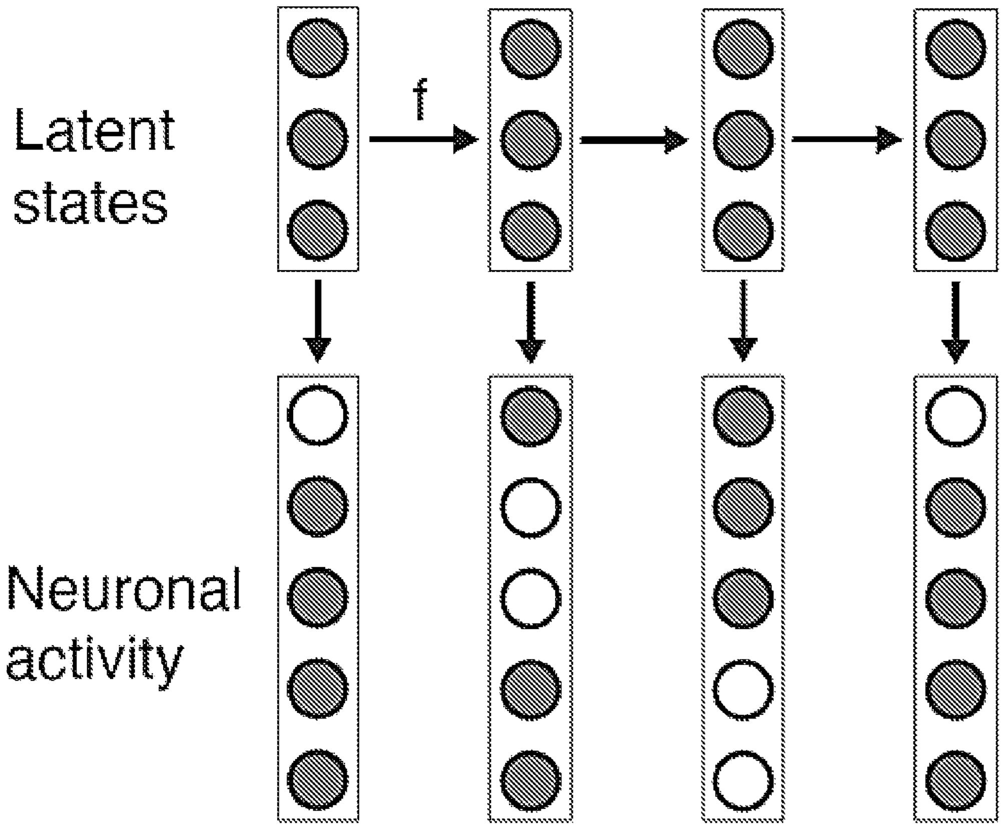
FIG. 1B is a diagram illustrating that observed neuronal activity reflects latent, low-dimensional dynamics in neural structures.

A large body of work suggests that the activity of individual neurons within a large population is not independent, but instead is coordinated through a lower-dimensional, latent state that evolves with stereotyped temporal structure, as shown in FIG. 1B. In accordance with the present disclosure, the state at time t can be represented as a vector $x_t \in \mathbb{R}^D$ that evolves according to dynamics captured by a function $f$ such that $x_{t+1} \approx f(x_t)$. Rather than directly observing the latent state $x_t$, neural activity represented as $y_t \in \mathbb{R}^N$ is observed, where $y_t \approx h(x_t)$ for some function h. Due both to the fact that $f$ imposes a significant amount of structure on the trajectory of the $x_t$'s and the fact that the dimension D of $x_t$ is typically expected to be far smaller than the number of possible observations N, one might expect that it should be possible to estimate the $x_t$'s without observing every neuron at every time step (i.e., measuring only some of the elements of each $y_t$), just as we generally infer latent states from only a fraction of the neurons in a given area. If so, principled exploitation of the space-time trade-off of neural interfaces might achieve higher-fidelity or more bandwidth-efficient characterization of neural population activity. Accordingly, to the inventors' knowledge, no methods have demonstrated modeling of dynamics from data in which the set of neurons being monitored changes dynamically at short intervals.

Figure 1C:
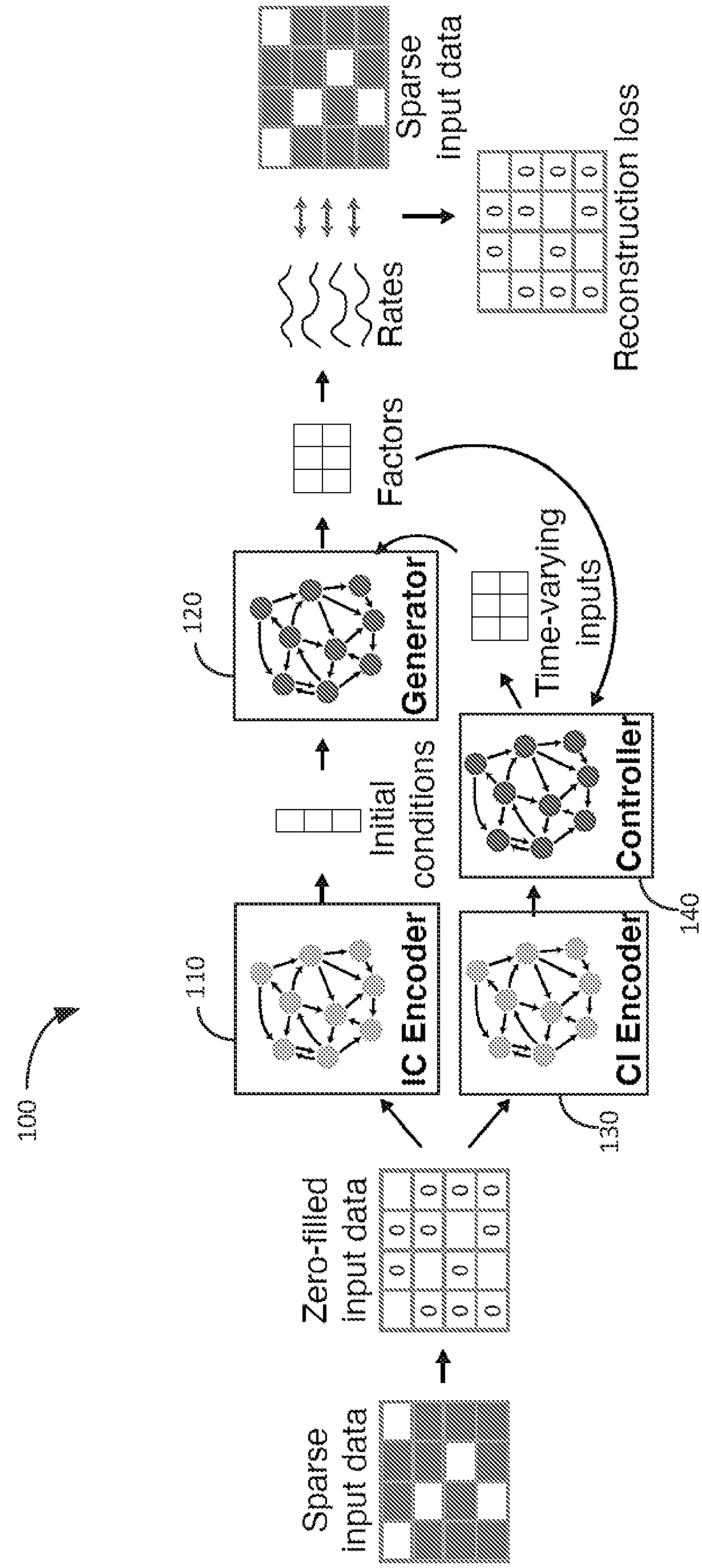
FIG. 1C is a system diagram in accordance with embodiments of the present disclosure for applying selective back-propagation through time (SBTT) to a sequential autoencoder for inferring latent dynamics from neural population activity.

To address this challenge, the present disclosure introduces a novel training process (referred herein as selective backpropagation through time (SBTT)), as shown in the non-limiting system diagram 100 of FIG. 1C. Here, the system includes an initial condition (IC) encoder RNN 110, a generator (e.g., a recurrent neural network (RNN)) 120, a controller input (CI) encoder 130, and a controller RNN 140. This type of arrangement involves a sequential variational auto-encoder and is referred to as a Latent Factor Analysis via Dynamical System (LFADS). See Chethan Pandarinath, et al., "Inferring Single-Trial Neural Population Dynamics using Sequential Auto-Encoders," Nature Methods, 15(10), pp. 805-815 (2018). It is assumed that the dynamics of neural data can be described by a continuous valued dynamical system, where the underlying dynamics are generated by the generator 120. Accordingly, dynamic factors extracted from the system can be used to generate (and thereby infer) nonlinear latent dynamics from the neural data, such as rates for the recorded neurons, etc. Initial conditions and time-varying input for the generator 120 are extracted from the observed spiking data for each trial by the encoder and controller RNNs 110, 130, 140. For sparsely sampled input data, SBTT allows us to compute a gradient using only the valid data and ignore the many missing samples. Because this feature only affects how the gradient is computed and the weights are updated, the network still infers event rates for every neuron at every time point, regardless of whether samples exist at that time point or not, which allows the trained network to accept sparsely sampled observations as input and produce high temporal resolution event rate estimates at its output.

Accordingly, exemplary systems and corresponding methods of the present disclosure are adapted to train deep generative models of latent dynamics from data for which the identity of observed variables varies from sample to sample. As such, SBTT can be used within a training algorithm to update weights in recurrent neural network models, where a training input pattern having intermittent sampled data is augmented to accommodate for the missing data and losses are calculated for the observed data points at the output. In various embodiments, the fact that each neuron is sampled at staggered, known times within the frame can be employed to increase the time resolution.

In general, there is a long and rich literature on methods for system identification, particularly in the case of linear dynamical systems. The last several years have witnessed a burst of activity in establishing a more robust theoretical understanding of when and how well these methods work. However, such works limit their focus to linear dynamical systems where the observations are fully sampled, i.e., where all of $y_t = Hx_t$ is measured for all t. In the case of a linear observation model ($y_t = Hx_t$) where only a subset of the elements of each $y_t$ is observed, the problem is reminiscent of a low-rank matrix completion problem. Specifically, by letting Y and X denote the matrices whose columns are given by the $y_t$ and $x_t$ respectively, we can write Y=HX. If D<<N, this is a low-rank matrix, and hence could be recovered from a random sampling of O(D log N) elements of each column of Y. However, this strategy essentially assumes that there is no relationship between the $x_t$, although one would expect to obtain significant improvements by exploiting the dynamical structure among the $x_t$ imposed by $f$. Indeed, Xu and Davenport show that if the dynamics $f$ are known, then it is possible to significantly reduce the sampling requirements. See Liangbei Xu and Mark Davenport, "Dynamic Matrix Recovery from Incomplete Observations Under an Exact Low-Rank Constraint," Advances in Neural Information Processing Systems (NeurIPS), Vol. 29 (2016) and Liangbei Xu and Mark Davenport, "Simultaneous Recovery of a Aeries of Low-Rank Matrices by Locally Weighted Matrix Smoothing" 2017 IEEE 7th International Workshop on Computational Advances in Multi-Sensor Adaptive Processing (CAMSAP), pp. 1-5 (2017). However, the question of learning such an $f$ from undersampled observations has again not been addressed in this literature.

To begin to describe an exemplary embodiment of the present disclosure, consider an exemplary embodiment of the SBTT training process, in which SBTT provides a learning rule for updating the weights of a neural network that allows backpropagation of loss for the portions of data that are present while preventing missing data from corrupting the gradient signal. This approach optimizes the model to reconstruct observed data while extrapolating to the unobserved data and is related to other approaches that augment network inputs and cost functions to reflect different subsets of the data matrix across samples, in particular coordinated dropout, masked language modeling, and Deep Interpolation. Though not designed for missing data, these previous approaches split fully-observed data into two portions—a portion that is provided at the input to the network and a portion that is used to compute loss at the output. Correspondingly, in various embodiments, SBTT accommodates for missing data by zero-filling missing input points and aggregating only losses for observed data points at the output.

In the context of a simple linear dynamical system where there are no (observable) inputs, a linear dynamical system can be modeled as:

$$x_{t+1} = Ax_t + w_t$$

$$y_t = Hx_t + z_t.$$

Here, $x \in \mathbb{R}^D$ represents a hidden state, $y \in \mathbb{R}^N$ represents observations, and $w_t$ and $z_t$ represent noise. The matrix A models the dynamics of the hidden state, and H models the observation function of an exemplary system. In this setting, the task at issue is to learn the parameters A and H given the observations $y_0, \ldots, y_{T-1}$ as well as the initial system state $x_0$.

SBTT is an improved variation of standard back-propagation where loss terms attributed to missing observations are ignored when computing back-propagation updates. For example, consider a linear recurrent network that can learn the linear model using a least squares loss:

$$\mathcal{L} = \frac{1}{T}\sum_{t=0}^{T-1}\frac{1}{2}\|y_t - Hx_t\|_2^2.$$

If the observation vector $y_t$ contains a missing entry at index i, the least squares loss would not contain the $$\left(y_t^i - (Hx_t)^i\right)^2$$

term, where the superscript i represents the ith index of a vector. If $o_t = Hx_t$ is taken to be the output of the recurrent network at time step t, then the loss with respect to the outputs of the network is:

$$\frac{\partial \mathcal{L}}{\partial o_t} = \frac{1}{T}(o_t - y_t). \qquad (1)$$

As such, SBTT requires that loss terms, and subsequently loss gradients, related to missing observations are ignored. This means that elements in the gradient vector (1) are ignored and set to 0 at indices i where the corresponding observations, $$y_t^i,$$

are missing. This gradient is then back-propagated through time to obtain gradients with respect to model parameters A and H as shown below:

$$\frac{\partial \mathcal{L}}{\partial H} = \sum_{t=0}^{T-1} \frac{\partial \mathcal{L}}{\partial o_t}(x_t)^T, \quad \frac{\partial \mathcal{L}}{\partial A} = \sum_{t=1}^{T-1} \frac{\partial \mathcal{L}}{\partial x_t} x_{t-1}^T,$$

where $$\frac{\partial \mathcal{L}}{\partial x_t}$$

is recursively computed using back-propagation through time:

$$\frac{\partial \mathcal{L}}{\partial x_t} = A^T \frac{\partial \mathcal{L}}{\partial x_{t+1}} + H^T \frac{\partial \mathcal{L}}{\partial o_t}.$$

The model parameters can then be updated or adjusted using gradient descent.

Referring back to the LFADS system of FIG. 1C, the use of SBTT is demonstrated for inferring nonlinear latent dynamics from neural population recordings. Here, the initial condition encoder RNN 110 operates on the neural spiking sequence y(t) and produces a conditional distribution over initial condition z, Q(z|y(t)). A Kullback-Leibler (KL) divergence penalty is applied as a regularizer for divergence between the uninformative prior P(z) and Q(z|y(t)). The initial condition is then drawn from Q(z|y(t)) and mapped to an initial state for a generator RNN 120, which learns to approximate the dynamical rules underlying the neural data. A controller RNN 140 takes as input the state of the generator 120 at each time step, along with a time-varying encoding of y(t) (produced by the controlled input encoder RNN 130), and injects a time-varying input u(t) into the generator 120. Similar to z, u(t) is drawn from a parameterized time-varying distribution of Q(u(t)|y(t)) produced by the controller 140. A second KL penalty is applied between P(u(t)) and Q(u(t)|y(t)). At each time step, the generator state evolves with input from the controller 140 and the controller 140 receives delayed feedback from the generator 120. The generator states are linearly mapped to factors, which are in turn mapped to the firing rates of the neurons using a linear mapping followed by an exponential nonlinearity. In various embodiments, a Poisson emission model is assumed for the observed spiking activity. The optimization objective combines the reconstruction cost of the observed spiking activity (i.e., the Poisson likelihood of the observed spiking activity given the rates produced by the generator network), the KL penalties described above, and L2 regularization penalties on the weights of the recurrent networks. During training, network weights are optimized using stochastic gradient descent and backpropagation through time.

In various embodiments, the first step in applying SBTT to the LFADS system (FIG. 1C) is to zero-fill the missing data before feeding it into the initial condition (IC) and controller input (CI) encoders 110, 130. After passing the data through the remaining hidden layers, the resulting rate estimates are used to compute a reconstruction loss (Poisson negative log-likelihood) for each observed neuron-timepoint and aggregate by taking the mean. The modified reconstruction loss is combined with other losses, and the network only optimizes for reconstruction of observed data and is free to interpolate at unobserved points. In various embodiments, population-based training along with coordinated dropout, together known as AutoLFADS, is used to optimize the models. This framework can achieve reliably high-performing models, regardless of dataset statistics.

Figure 2A:
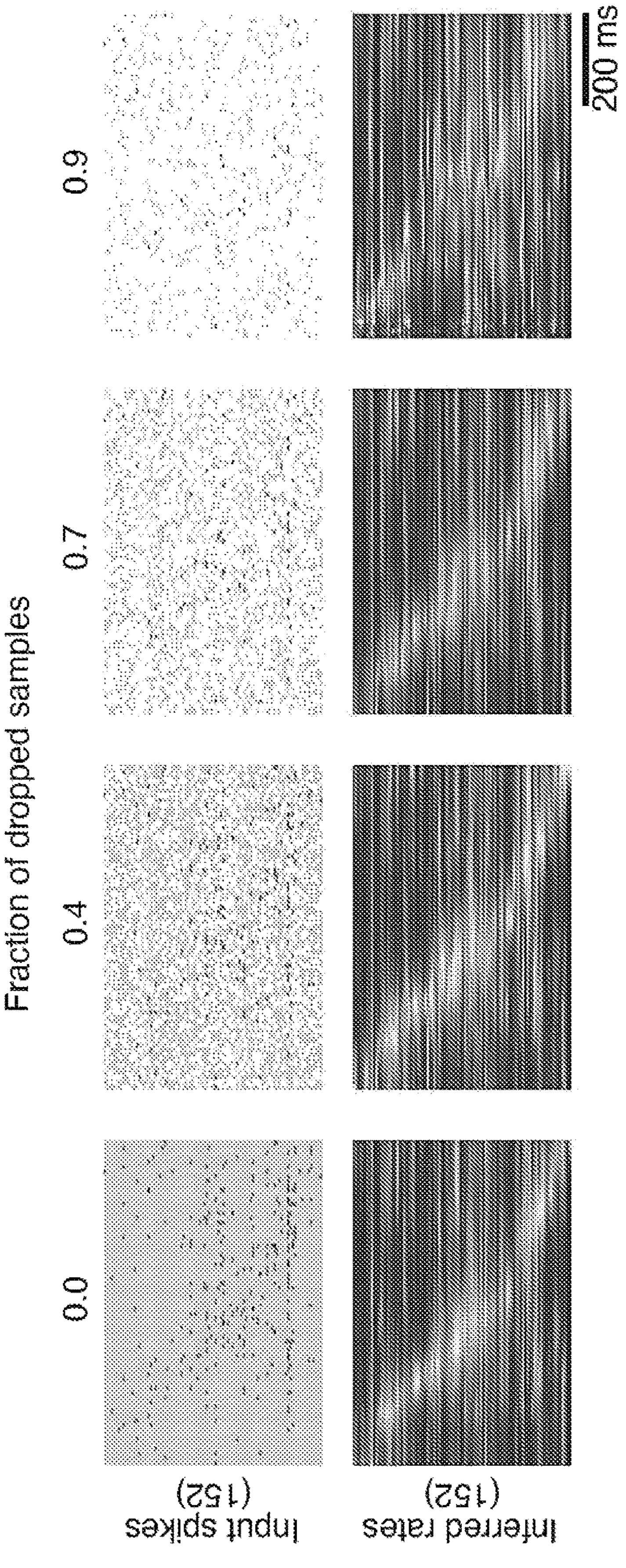
FIG. 2A shows spike count input (top row) and inferred rate output (bottom row) for an example trial with increasingly sparse observations, where masked data is shown in white.

Given that a key target application of AutoLFADS with SBTT is to enable reduced sampling of electrodes (either to enable recording from larger populations of electrodes with limited bandwidth (such as with Neuropixels) or to reduce power consumption (such as for fully-implantable brain-machine interfaces), a large and well-characterized dataset containing electrophysiological recordings from macaque primary motor and dorsal premotor cortex (M1/PMd) was initially used for testing the performance of AutoLFADS with SBTT. The data were collected during a delayed reaching task, in which the macaque monkey made both straight and curved reaches from a center position, around virtual barriers (the maze), to one of 108 possible target positions. The dataset consisted of 2296 trials with 202 sorted units aligned to movement onset in a window from 250 ms before to 450 ms after this point. Spike counts were binned at 10 ms (70 bins). 50 randomly selected units were held out from modeling to use for evaluation of inferred latent factors, and various missing data scenarios were simulated for the remaining 152 units by randomly masking a fraction of the observations at each time step for each trial, as shown in the top row of FIG. 2A. In particular, the top rows shows a spike count input and inferred rate output for an example trial with increasingly sparse observations, where masked data is shown in white.

For each of the masked datasets, AutoLFADS with SBTT was used to robustly train neural dynamics models. Latent factors and firing rates were inferred for all time steps, despite the missing (masked) observations. Even with 70% dropped samples, the inferred firing rates showed structure comparable to the model of fully observed data, as shown in the bottom row of FIG. 2A.

Figure 2B:
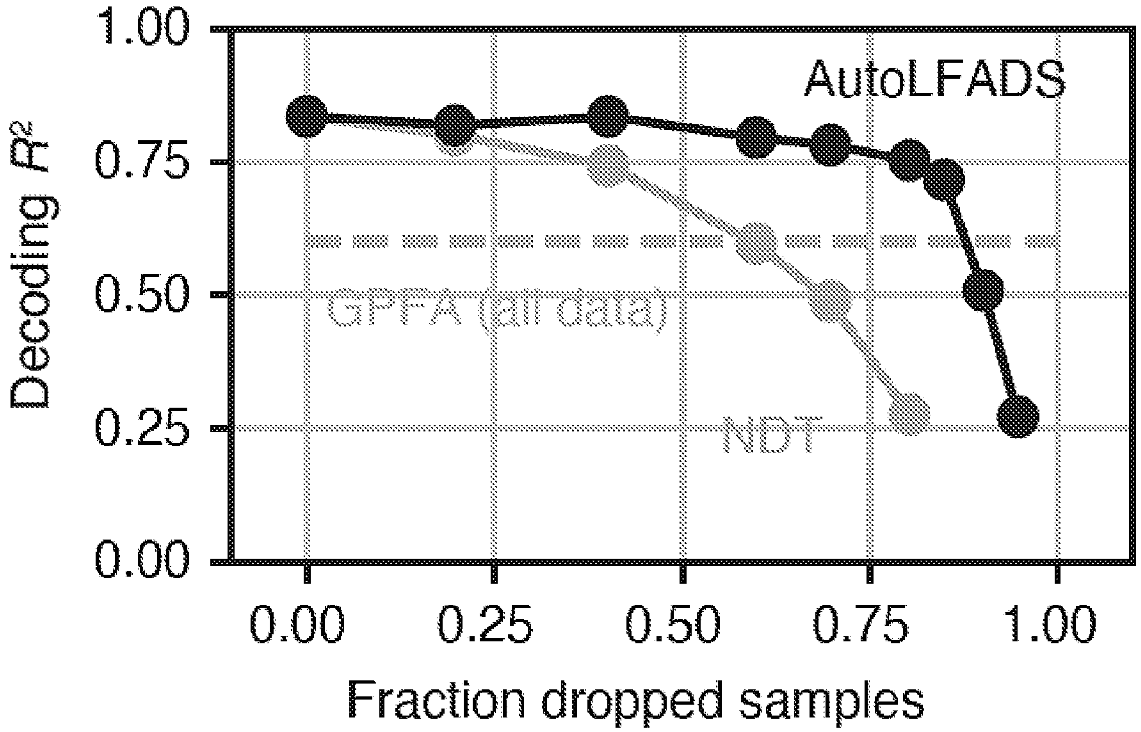
FIG. 2B shows a plot depicting the accuracy of linear hand velocity decoding from inferred latent factors.
Figure 2C:
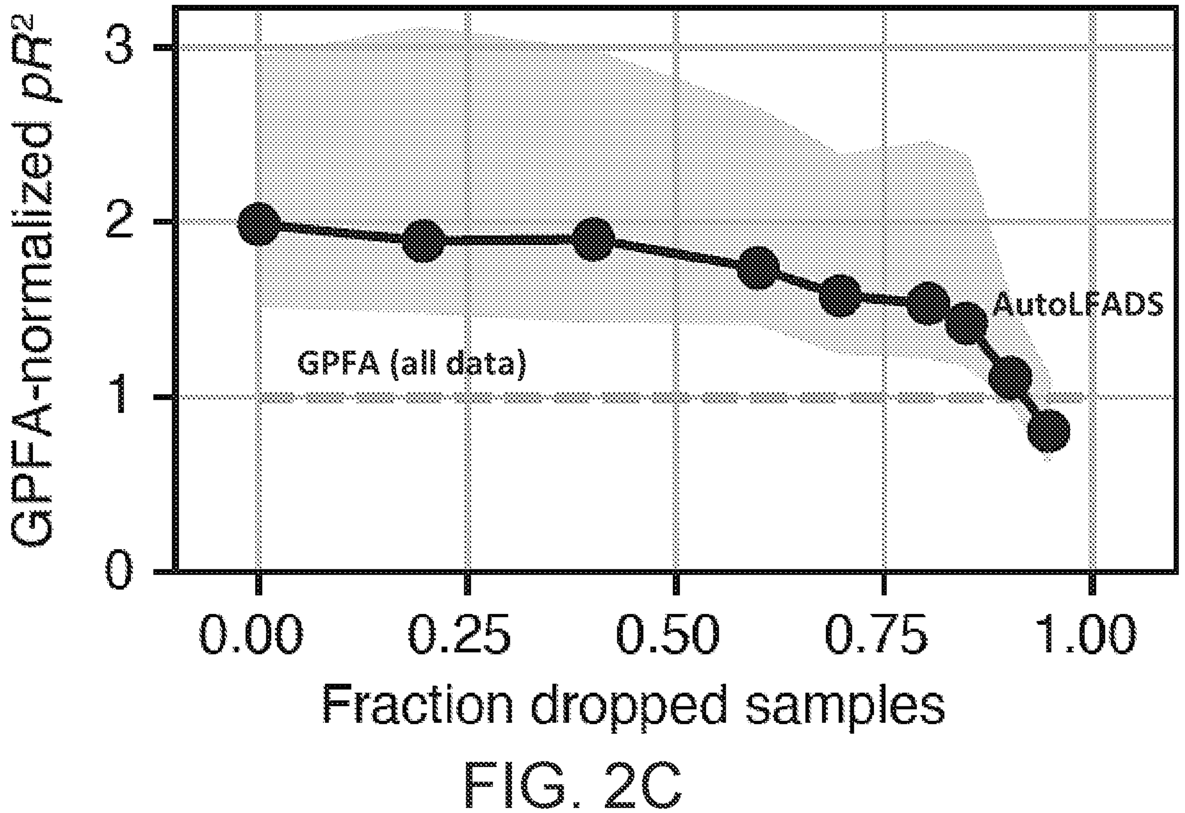
FIG. 2C shows a plot depicting the quality of generalized linear models fits from inferred latent factors.

To determine whether the models were able to capture biologically relevant information from sparsely sampled data, the inferred latent factors were evaluated in terms of their ability to predict hand velocity, as shown in FIG. 2B, and the spiking activity of held-out units, as shown in FIG. 2C. As a recognizable baseline, a Gaussian Process Factor Analysis (GPFA) model (40 latent dimensions, 20 ms bins) was trained on the fully observed dataset. GPFA is a commonly-used and versatile method for extracting latent structure from neural population activity, and these parameters have been validated on this dataset in prior work. Simple linear decoders were trained to predict hand velocity from the inferred latent factors with an 80 ms delay (50/50, trial-wise train-test split), and evaluated using the coefficient of determination, averaged over x- and y-dimensions. For AutoLFADS with SBTT, decoding performance showed a minimal decline until around 80% of the data had been dropped, with some models outperforming the GPFA baseline using as little as 15% of the original data, as shown in FIG. 2B. To measure how well the models captured the population structure, generalized linear models (GLMs) were trained to predict the spikes for the held out units and evaluated fit quality using pseudo-$R^2$ ($pR^2$). Similar to the decoding results, AutoLFADS with SBTT was found to capture population structure significantly better than fully observed GPFA, and that the information content of the factors declined slowly until about 80% missing samples, as shown in FIG. 2C.

To evaluate the importance of modeling latent dynamics for accurate inference with sparsely observed data, neural data transformers (NDT) were also trained with selective backpropagation on the same datasets, and it was found that decoding performance from inferred firing rates declined faster than for AutoLFADS with SBTT, but NDT still outperformed GPFA with up to 40% missing data, as shown FIG. 2B.

Additional testing explored the recovery of high frequency features in 2P imaging. Considering that high-frequency features of neural responses are generally assumed to be lost in 2P imaging due to limited scanning speeds and indicator kinetics, it was hypothesized that some of the loss is actually due to standard 2P data processing, which discards information regarding sub-frame sampling time of individual neurons, and additionally hypothesized that SBTT could recover some of this information. The inherently staggered sampling of neurons due to raster scanning can be treated as a time series with missing values and higher temporal resolution than the frame rate. SBTT was tested on both simulated and real calcium imaging data. In both cases, AutoLFADS was adapted to better account for the statistics of deconvolved calcium activity (AutoLFADS-ZIG, see supplement) by substituting the underlying Poisson emission model with a Zero-Inflated Gamma distribution. During experimental testing, three methods were compared, namely: AutoLFADS-ZIG with SBTT (ALFADS-SBTT), a standard frame-resolution version of AutoLFADSZIG without SBTT (ALFADS), and Gaussian smoothing of deconvolved calcium activity.

Accordingly, artificial 2P data from a population of simulated neurons (278 neurons) whose firing rates were linked to the state of an underlying Lorenz system were generated. To assess the ability to reconstruct latent dynamics at different frequencies, Lorenz systems with different speeds were simulated. For each Lorenz system, the Z dimension power spectrum peak, which contains the most concentrated and highest frequencies, was reported. Fluorescence traces were simulated from the spike trains using an order 1 autoregressive model followed by a non-linearity and injected with 4 sources of noise. Firing rates were simulated with a sampling frequency of 100 Hz, and a "location" was randomly chosen for each simulated neuron, such that sampling times for different neurons were staggered to simulate 2P laser scanning sampling times. This produced fluorescence traces with one of three possible associated phases (0,11, 22 ms) and overall sample rate 33 Hz. Neural activity from the fluorescence traces was deconvolved using the OASIS algorithm (Online Algorithm for Scalable Image Similarity) as implemented in the CaImAn package (Calcium Imaging data Analysis).

For ALFADS-SBTT, the sub-frame phase information was used to generate intermittently-sampled data. In contrast, for both ALFADS and Gaussian smoothing, phase information was discarded and samples were collapsed into a single time bin per frame, as is standard in 2P imaging data processing. To evaluate the performance in recovering the ground truth Lorenz states, a mapping was trained from the output of each method (i.e., the inferred event rates from ALFADS-SBTT and ALFADS, and smoothed deconvolved events by Gaussian smoothing; signals were interpolated to 100 Hz for the latter methods) to the ground truth Lorenz states using cross-validated ridge regression. $R^2$ between the true and inferred Lorenz states was used as a metric of performance.

Figure 3A:
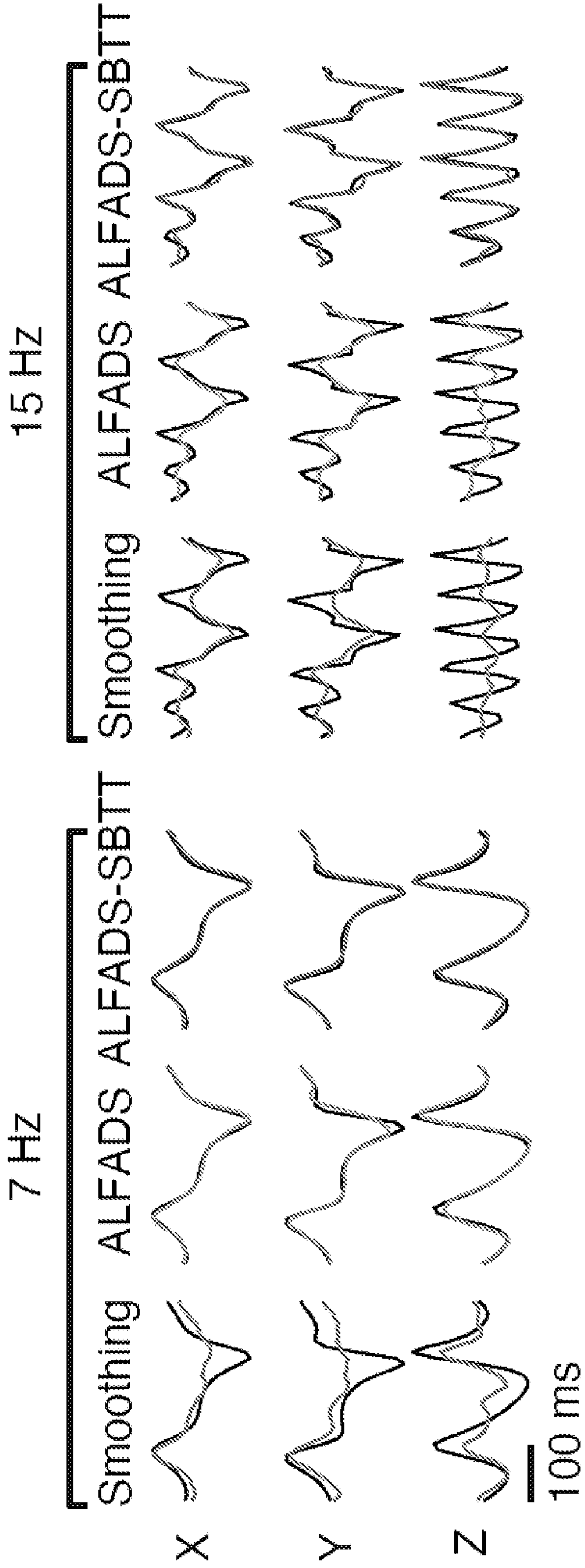
FIG. 3A shows plots for true and inferred Lorenz latent states (X/Y/Z dimensions) for a single example trial from Lorenz systems simulated at two different frequencies (7 Hz and 15 Hz).
Figure 3B:
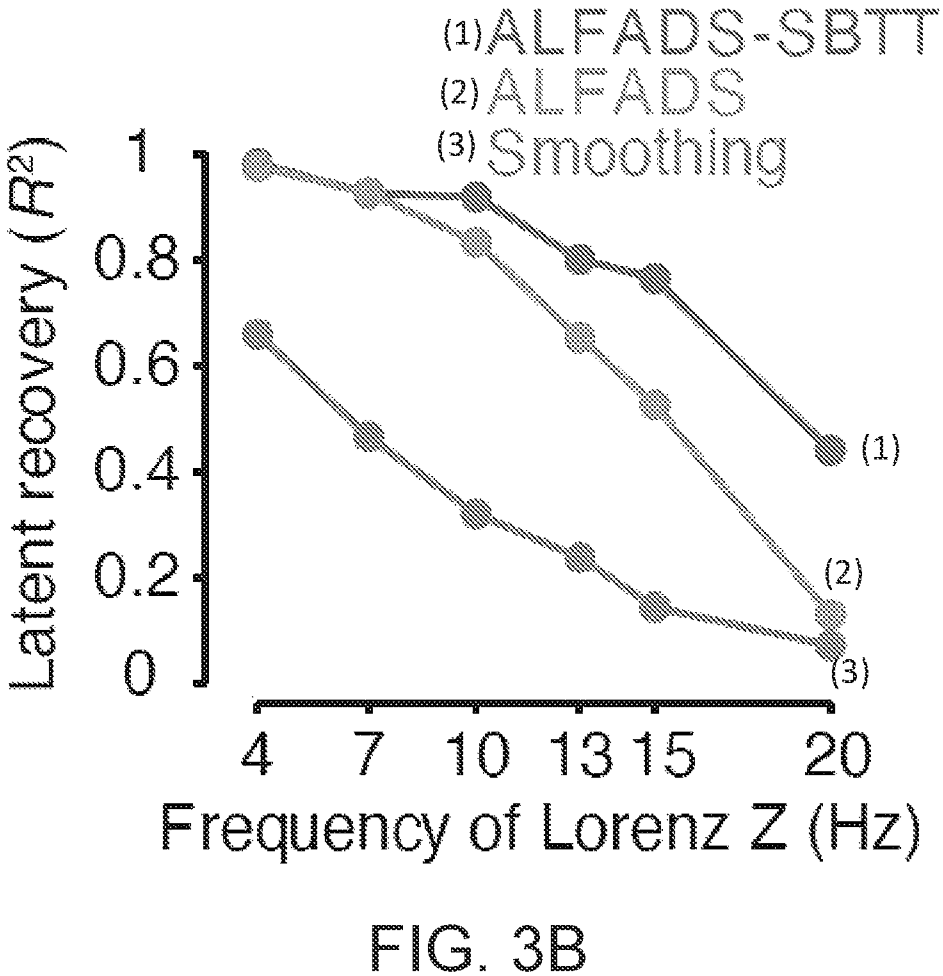
FIG. 3B shows a plot of performance in estimating the Lorenz Z dimension as a function of Lorenz speed across experimental trials using SBTT and without SBTT.

The true and predicted Lorenz states for two example trials are illustrated in FIG. 3A. The performance of Gaussian smoothing and ALFADS dropped substantially for higher Lorenz state frequencies, while ALFADS-SBTT maintained reasonable estimates (latent recovery $R^2 \approx 0{:}8$) up to 15 Hz and never dropped below 0.4 in the range of tested frequencies, as shown in FIG. 3B.

Figure 4A:
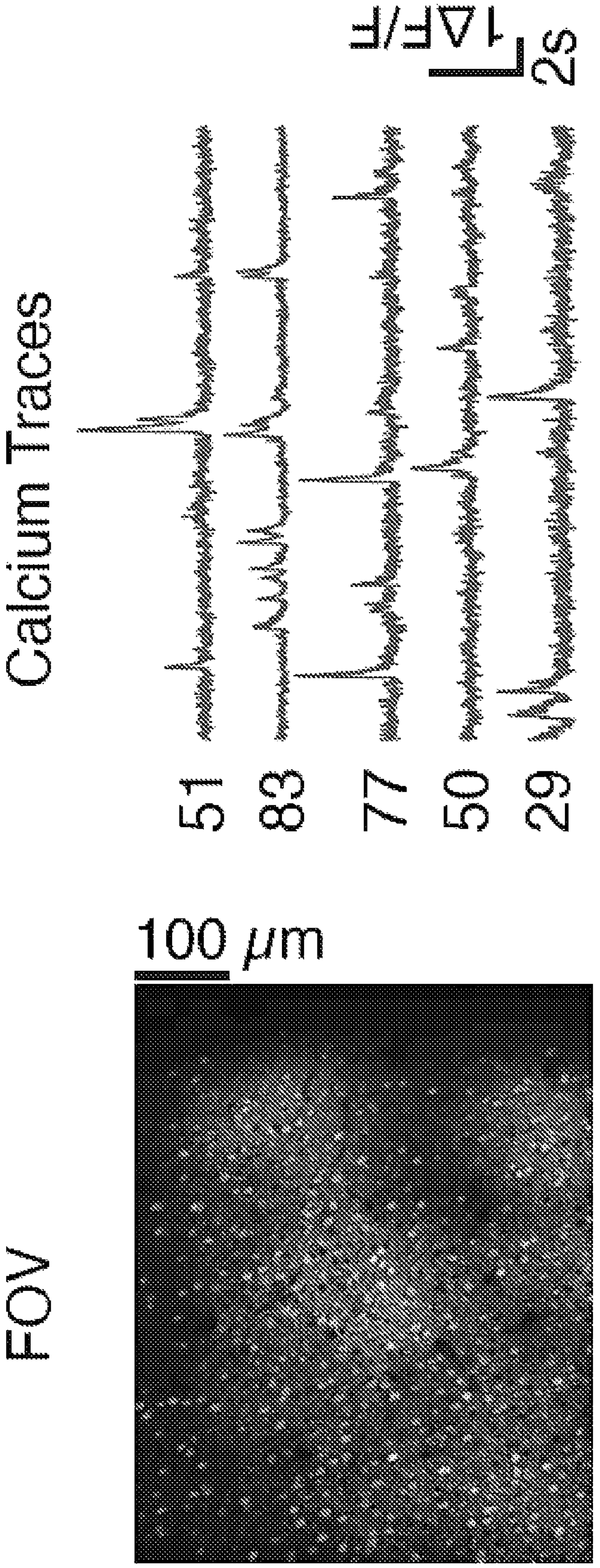
FIG. 4A shows an example field-of-view (FOV) and a plot of calcium traces (dF/F) for an experimental SBTT trial.

In a follow-up experimental trial, SBTT was applied to real 2P calcium imaging data collected from the motor cortex in a mouse performing a forelimb water grab task. The dataset comprised 475 trials in which the mouse was cued by a tone to reach to a left or right spout and retrieve a droplet of water with its right forepaw. Pyramidal cells expressing the GCaMP6f calcium indicator were imaged with a two-photon microscope at a 31 Hz frame rate, and a subset of 439 modulated neurons within the field-of-view (FOV) were considered for analysis, as shown on FIG. 4A. Accordingly, the left side of FIG. 4A shows an example field-of-view (FOV) and the right side shows example calcium traces (dF/F) from a single trial for 5 example neurons, where the mouse's forepaw position was tracked in 3D at 150 Hz with stereo cameras & DeepLabCut software, and the calcium events were deconvolved with OASIS.

2P data for ALFADS-SBTT were processed analogously to the simulations, using neuron locations within the FOV to inform the intermittent sampling times. Trials represented a window spanning 200 ms before to 800 ms after the mouse's reach onset. This resulted in 100 time points per trial for ALFADS-SBTT, and 31 time points per trial for ALFADS and Gaussian smoothing. For both ALFADS-SBTT and ALFADS, trials were split into 80/20 train/validation.

Figure 4B:
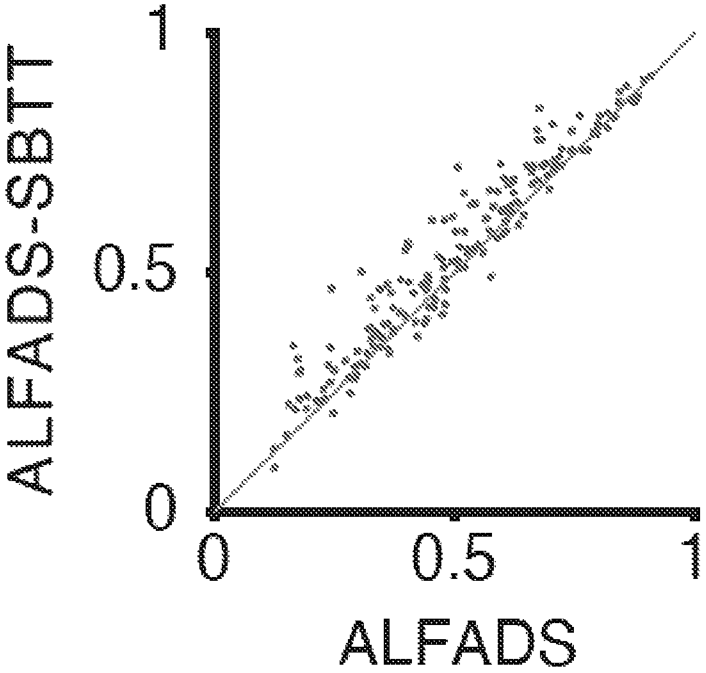
FIG. 4B shows a plot depicting the recovery of trial-averaged responses via single-trial event rates inferred using SBTT and without SBTT.

To compare representations inferred by ALFADS-SBTT and ALFADS, an evaluation was first performed on how closely the single-trial event rates inferred for each neuron resembled that neuron's peri-stimulus time histogram (PSTH). PSTHs were calculated by taking the average of the Gaussian-smoothed deconvolved events across trials within each experimental condition. Because the mouse's reaches were not stereotyped to each spout (i.e., left or right), trials were subgrouped into 4 finer conditions based on forepaw Z position during the reach. ALFADS-SBTT single-trial event rates were more strongly correlated with neurons' PSTHs compared to those inferred by ALFADS, as shown in FIG. 4B.

Figure 4C:
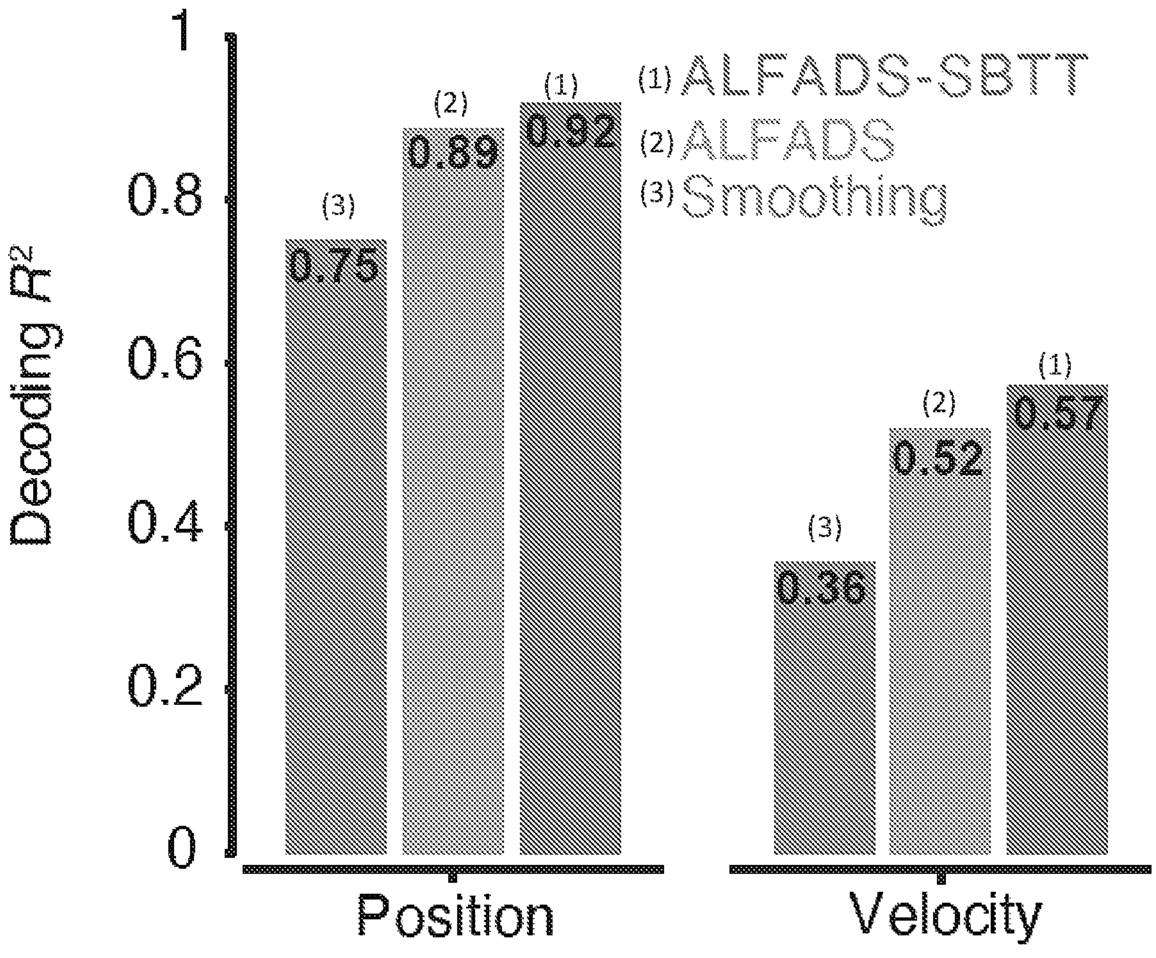
FIG. 4C shows a plot of decoding performance between a true and decoded position (left) and velocity (right) across experimental trials of a mouse's paw during reaching using SBTT and without SBTT.
Figure 4D:
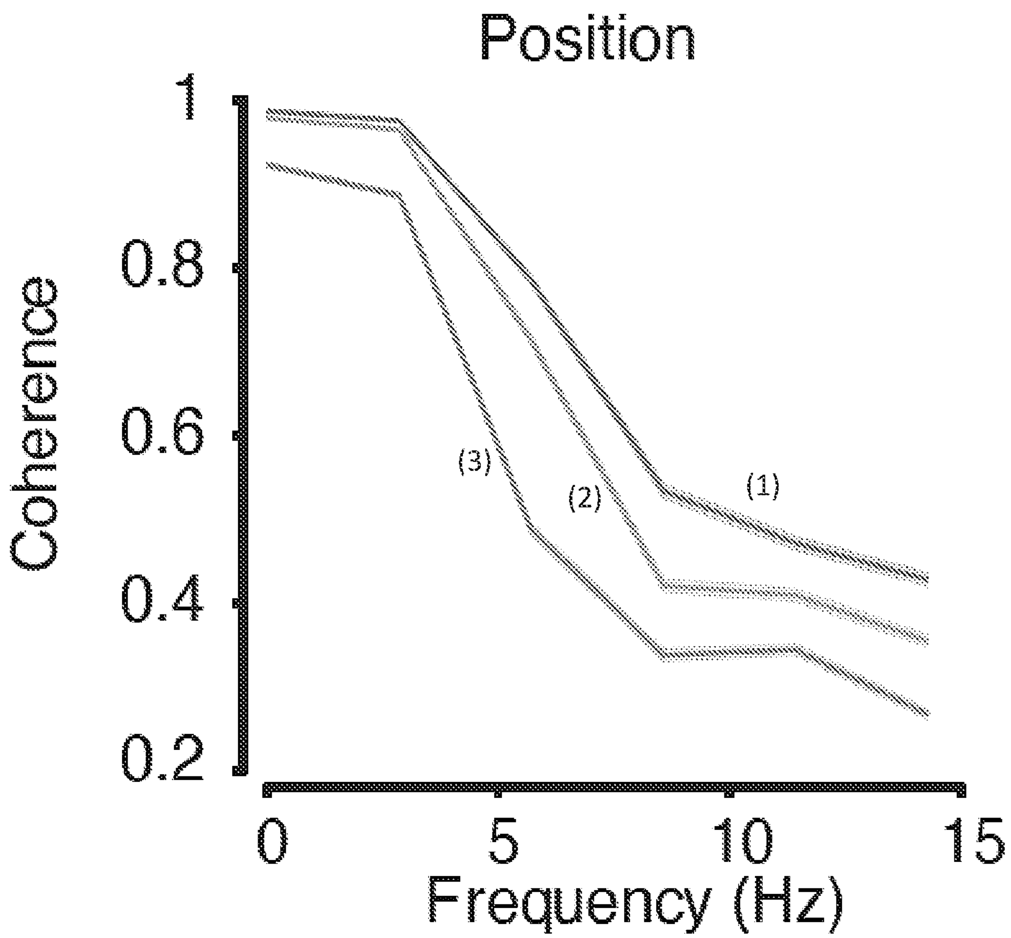
FIG. 4D shows a plot depicting a quality of reconstructing the kinematics across frequencies by computing the coherence between the true and decoded positions for reconstruction methods across experimental trials using SBTT and without SBTT.

The trial next decoded the mouse's single-trial forepaw kinematics (position and velocity) based on each model's output. Decoding was performed using ridge regression with 5-fold cross validation. $R^2$ was used between the true and predicted hand positions and velocities as a metric of performance. $R^2$ was averaged across XYZ behavioral dimensions and all 5 folds of the test sets. Decoding using ALFADS-SBTT inferred rates outperformed results from smoothing deconvolved events, or from the ALFADS inferred rates, as shown in FIG. 4C. Because the improvement of decoding performance for position is modest, assessment of how the improvement was distributed as a function of temporal frequency was performed by computing the coherence between the true and decoded positions for each method, as shown in FIG. 4D. Consistent with the simulations, ALFADS-SBTT predictions showed higher coherence with true position than predictions from other methods, with improvements more prominent at higher frequencies (5-15 Hz).

In an additional experiment, testing was performed using high-bandwidth observations. For example, in implantable or wireless applications, using a wireless device's full interface bandwidth might incur significant power costs, which would burden users with frequent battery recharging. However, it may be possible to leverage high-bandwidth recordings from limited time periods to learn models of latent dynamics, and then switch to low-bandwidth modes for subsequent long-term operation, in order to minimize ongoing power use. Such an approach is enabled by the stability of latent dynamics over months to years.

Figure 5A:
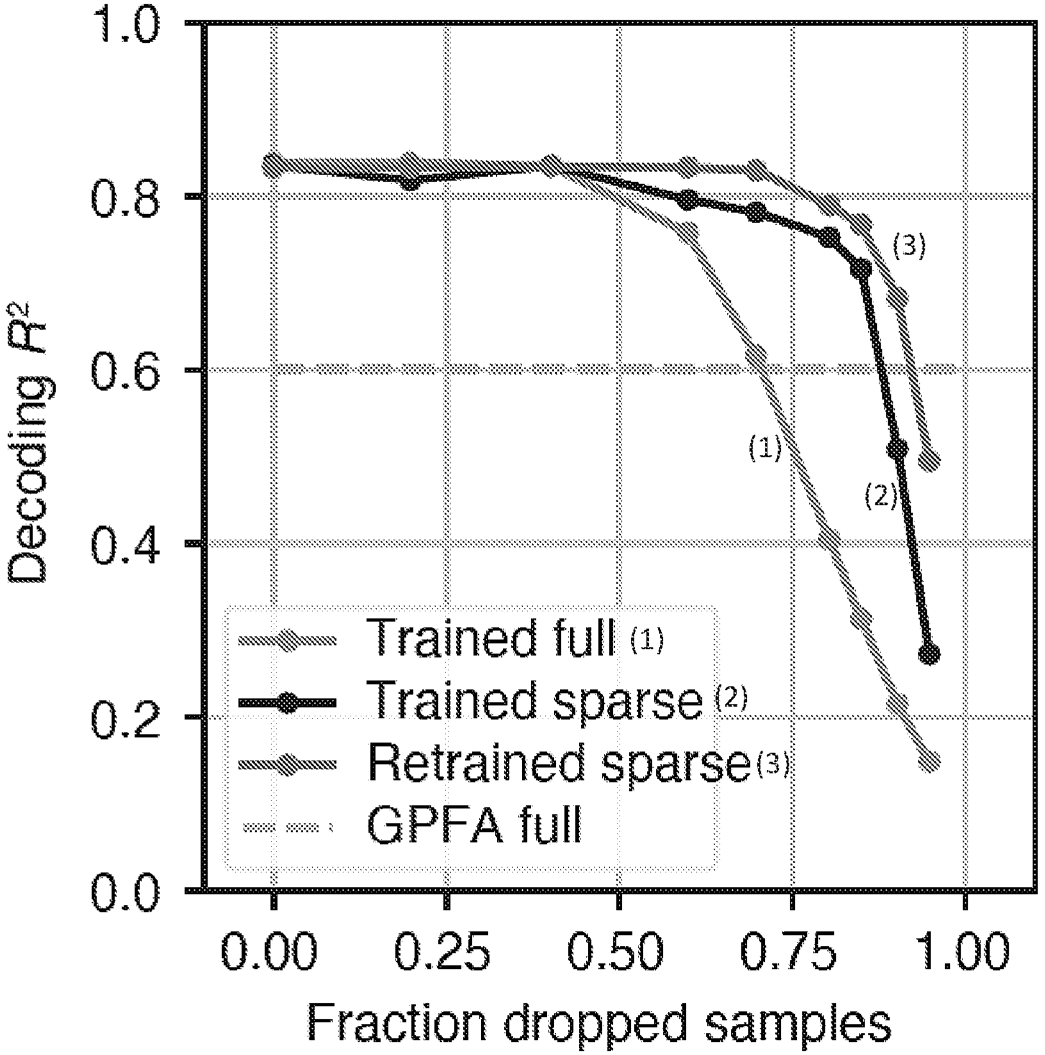
FIG. 5A is a plot comparing decoding performance in an experimental trial using training on fully observed data and inference on sparse data, training and inference on sparse data; and training on fully observed data, followed by encoder retraining and inference on sparse data.
Figure 5B:
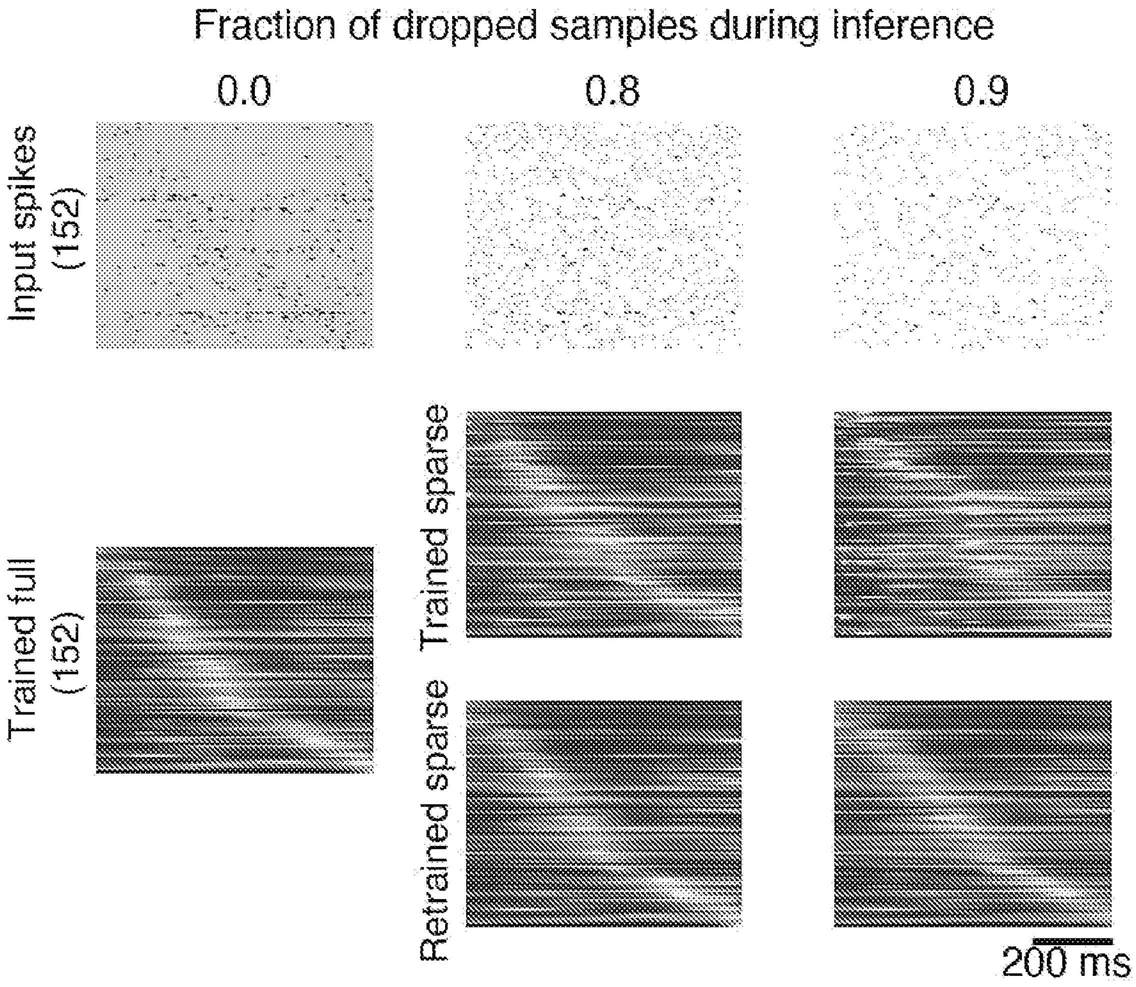
FIG. 5B shows spike count input (top row) and inferred rate output (bottom rows) for an experimental trial using fully observed data and inference on sparse data, training and inference on sparse data; and training on fully observed data, followed by encoder retraining and inference on sparse data.

These concepts were tested on the same electrophysiological dataset described earlier in connection with macaque monkeys. After training AutoLFADS models on the fully sampled data, the initial condition and controller input encoders 110, 130 (FIG. 1C) were retrained using SBTT on each of the sparsely sampled datasets. The weights for the rest of the network remained fixed. In this way, the dynamical rules learned from the fully sampled data are maintained, while the mappings from data to the initial conditions and controller inputs are adapted for sparse data. Accordingly, FIG. 5A provides a plot comparing decoding performance for the various training methods applied to the encoding networks 110, 130, where FIG. 5B shows spike count input (top row) and inferred rate output (bottom rows) for the experimental trial using fully observed data and inference on sparse data, training and inference on sparse data; and training on fully observed data, followed by encoder retraining and inference on sparse data.

Thus, in the figure, "Trained full" indicates training on fully observed data and inference on sparse data; "Trained sparse" indicates training and inference on sparse data; and "Retrained sparse" indicates training on fully observed data, followed by encoder retraining and inference on sparse data. As shown in the figure, "Retrained sparse" maintained performance to high levels of missing data, outperforming AutoLFADS trained on fully observed data but run with missing data ("Trained full") or training directly on sparsely-sampled data ("Trained sparse"). These results show that dynamics models are learned most accurately on fully observed data, but that the learned dynamics can be used to model sparsely sampled data if models are adapted to the sparser domain using SBTT.

While particular recurrent neural network arrangements have been described to illustrate aspects of systems and methods of the present disclosure, such systems/methods are not limited to these examples. Accordingly, exemplary systems and methods of the present disclosure can be implemented in any type of recurrent neural network architecture that learns weights (e.g., parameters of a neural network) via backpropagation through time to adapt to intermittent sampling. In general, a recurrent neural network is a neural network that receives an input sequence and generates an output sequence from the input sequence. In particular, a recurrent neural network can use some or all of the internal states of the network from a previous time step in computing an output at a current time step. Such a recurrent neural network model can be implemented by one or more computers that are configured to process input sets to generate neural network outputs for each input set. The input set can be a collection of multiple inputs for which the recurrent neural network should generate the same neural network output regardless of the order in which the inputs are arranged in the collection. In another aspect, the present disclosure describes a system implemented as computer programs on one or more computers in one or more locations that is configured to train a recurrent neural network model that receives a neural network sparsely sampled input, accommodate or augment the neural network input using SBTT, adjusts or updates values of the parameters of the recurrent neural network model (e.g., using stochastic gradient descent) and sequentially generate an output sequence for the neural network input.

These systems/methods have application to any circumstance in which scanning or temporal multiplexing is used to sample from a dynamical system. For example, ultrasound imaging might be used to scan a beating heart. Because only a limited number of voxels (three-dimensional pixels) can be acquired per second due to physical limitations of existing ultrasound machines, current systems are limited to either blurred images, small volumes scanned/two-dimensional slices, or low resolution. SBTT together with a neural network could be used to learn the dynamics of the system and use each scanned voxel to provide information about voxels not scanned at that moment, enabling simultaneously high spatial and temporal resolution in a larger-volume image. Magnetic resonance imaging (MRI) or functional MRI (fMRI) are similarly scanning methodologies, and could therefore benefit from SBTT. These are just two more non-limiting examples of applications of SBTT.

Figure 6:
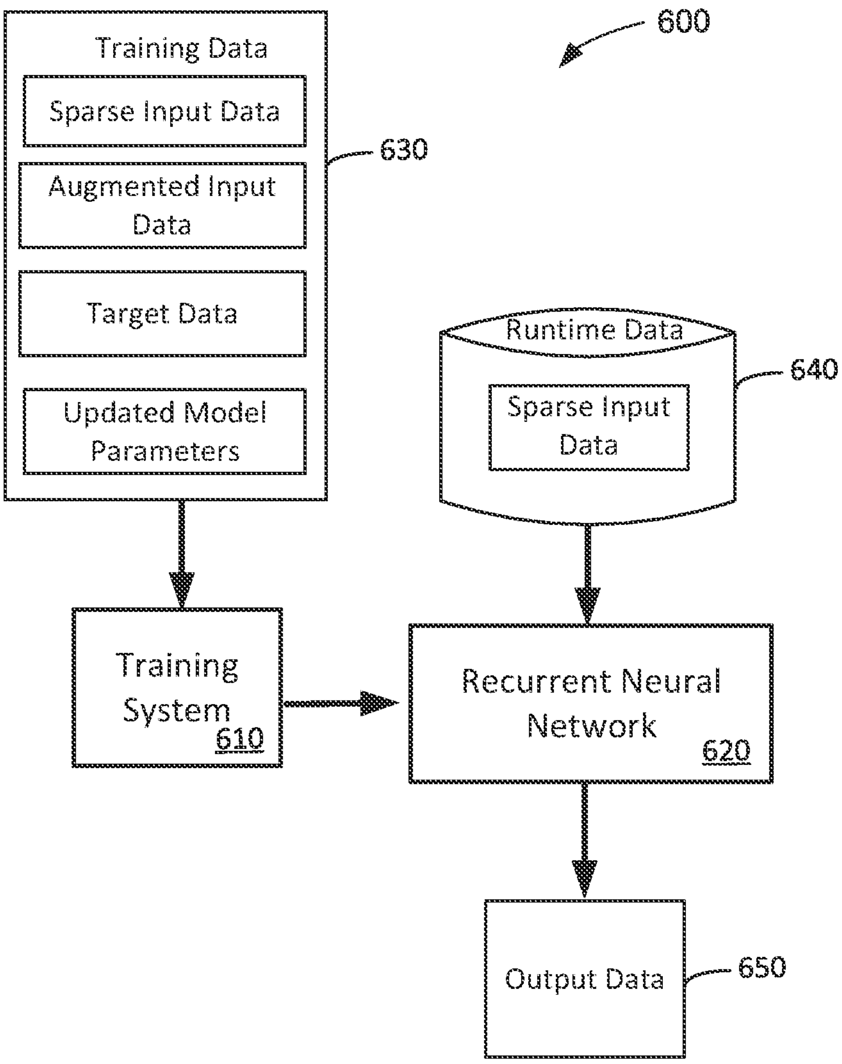
FIG. 6 shows a block diagram for an example environment in which a recurrent neural network training system trains a recurrent neural network model in accordance with various embodiments of the present disclosure.

Referring now to FIG. 6, a block diagram is shown for an example environment 600 in which a recurrent neural network training system 610 trains a recurrent neural network 620 using a training algorithm as described in the present disclosure. In a training phase, the training system 610 processes training data 630 that can include, but is not limited to, sparse input data (e.g., sparse input data sequence), such that the training system 610 is configured to generate augmented input data by zero-filling missing input points that is applied to the recurrent neural network 620. After passing the data through the recurrent neural network 620, a reconstruction loss is computed for each observed data point at the output using the same input data sequence, where the reconstruction loss is used to adjust and optimize values of model parameters of the recurrent neural network until training is completed. Accordingly, during a runtime execution of the recurrent neural network 620, new sparse input data can be applied to the trained recurrent neural network, as runtime data 640, such that the network 620 is configured to reconstruct the output at observed data points and is configured to interpolate the output at unobserved data points and generate output data 650 (e.g., output data sequence).

Figure 7:
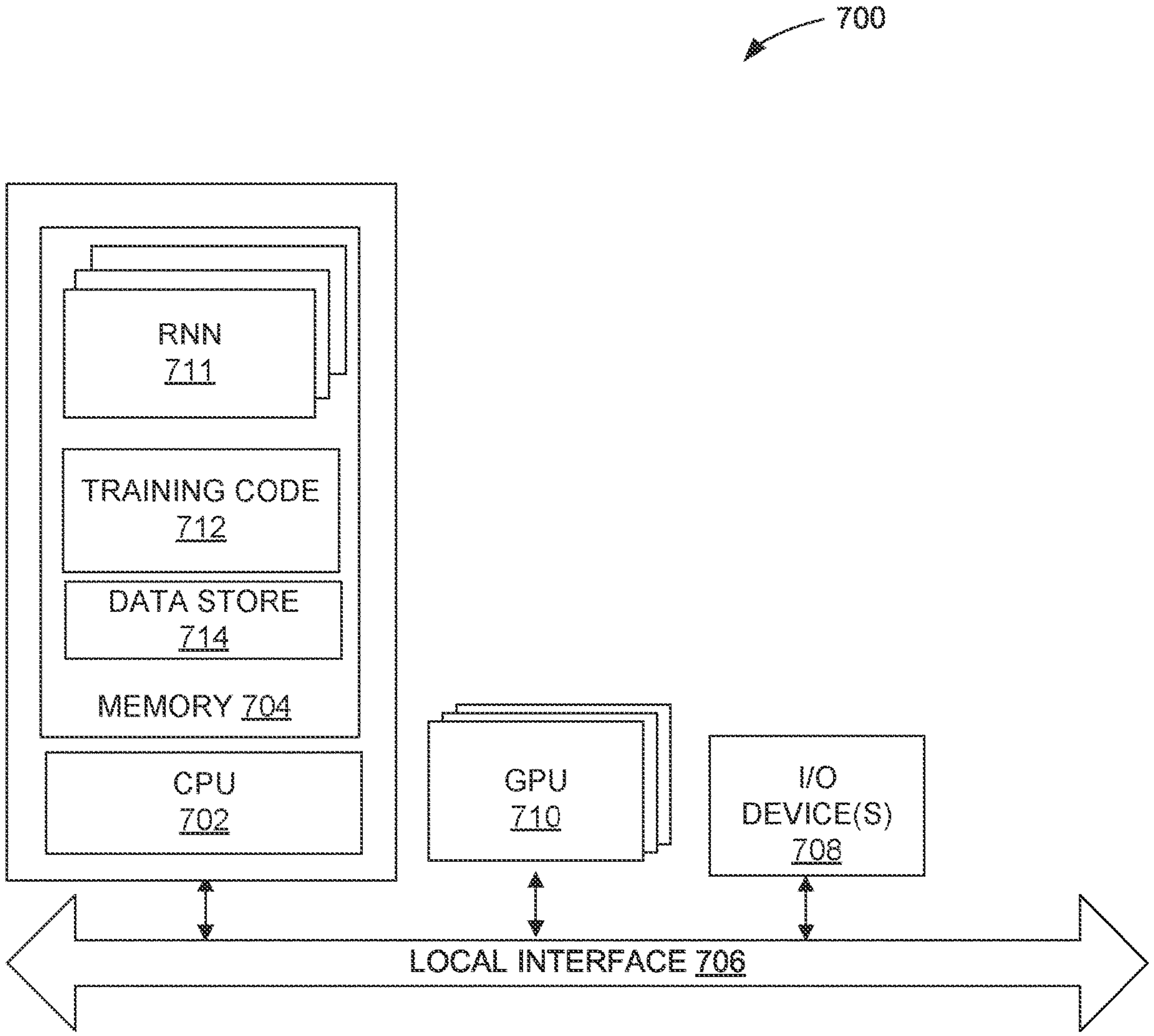
FIG. 7 shows a block diagram of a computing device that can be used to implement various embodiments of the present disclosure.

FIG. 7 depicts a schematic block diagram of a computing device 700 that can be used to implement various embodiments of the present disclosure, including the training system 610 and/or recurrent neural network 620 and/or components of the LFADS system of FIG. 1C. An exemplary computing device 700 includes at least one processor circuit, for example, having a hardware processor (CPU) 702 and a memory 704, both of which are coupled to a local interface 706, and one or more input and output (I/O) devices 708. The local interface 706 may comprise, for example, a data bus with an accompanying address/control bus or other bus structure as can be appreciated. The computing device 700 further includes Graphical Processing Unit(s) (GPU) 710 that are coupled to the local interface 706 and may utilize memory 704 and/or may have its own dedicated memory. The CPU and/or GPU(s) can perform various operations such as image enhancement, graphics rendering, image/video processing, recognition (e.g., text recognition, object recognition, feature recognition, etc.), image stabilization, machine learning, filtering, image classification, and any of the various operations described herein.

Stored in the memory 704 are both data and several components that are executable by the processor 702. In particular, stored in the memory 704 and executable by the processor 702 are code for implementing one or more recurrent neural networks (RNN) models 711 and logic/instructions/code 712 for training recurrent neural network model(s) 711 using selective backpropagation through time (SBTT). Also stored in the memory 704 may be a data store 714 and other data. The data store 714 can include a database for input or source data images/sequences, target or output data images/sequences, and potentially other data. In addition, an operating system may be stored in the memory 704 and executable by the processor 702. The I/O devices 708 may include input devices, for example but not limited to, a keyboard, mouse, etc. Furthermore, the I/O devices 708 may also include output devices, for example but not limited to, a printer, display, etc.

Certain embodiments of the present disclosure can be implemented in hardware, software, firmware, or a combination thereof. If implemented in software, the training RNN(s) using SBTT logic or functionality are implemented in software or firmware that is stored in a memory and that is executed by a suitable instruction execution system. If implemented in hardware, the training RNN(s) using SBTT logic or functionality can be implemented with any or a combination of the following technologies, which are all well known in the art: discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In brief, the present disclosure introduces a novel approach for learning latent dynamics from irregularly or sparsely sampled time series data. For example, in experiments on real electrophysiology data from a macaque motor cortex, it is shown that models trained with SBTT learn biologically relevant neural dynamics with up to 80% masked training data. On data from a synthetic 2P calcium imaging simulation, models trained with SBTT are shown to capture high frequency features of the latent dynamics that are not captured at frame resolution. The present disclosure also showed improved behavioral decoding performance on real 2P imaging data from a primary motor cortex of a mouse. Additionally, it is demonstrated that retraining the early layers of a full-data model on sparse datasets using SBTT can substantially improve decoding performance at the most challenging sparsity levels, outperforming models trained on the sparse data alone. Taken together, these results clearly show that SBTT is a valuable technique for training models with irregularly or sparsely sampled time series data.

In summary, modern neural interfaces allow access to the activity of up to a million neurons within brain circuits. However, bandwidth limits often create a trade-off between greater spatial sampling (more channels or pixels) and the temporal frequency of sampling. Here, the present disclosure demonstrates that it is possible to obtain spatio-temporal super-resolution in neuronal time series by exploiting relationships among neurons, embedded in latent low-dimensional population dynamics. The exemplary novel neural network training strategy (selective backpropagation through time (SBTT)) enables learning of deep generative models of latent dynamics from data in which the set of observed variables changes at each time step. The resulting models are able to infer activity for missing samples by combining observations with learned latent dynamics.

Accordingly, the present disclosure illustrates performance of exemplary novel methods and systems across multiple potential applications. For example, SBTT applied to sequential autoencoders demonstrates efficient and higher-fidelity characterization of neural population dynamics in electrophysiological and calcium imaging data when applied to electrophysiology, SBTT enables accurate inference of neuronal population dynamics with lower interface bandwidths, providing an avenue to significant power savings for implanted neuroelectronic interfaces. In applications to two-photon calcium imaging, SBTT accurately uncovers high-frequency temporal structure underlying neural population activity, substantially outperforming the current state-of-the-art. Additionally, the present disclosure demonstrates that the performance could be further improved by first using limited, high-bandwidth sampling to pretrain dynamics models, and then using SBTT to adapt these models for sparsely-sampled data.

Such methods/systems may also be extended to other applications, settings (microscopes, calcium indicators, expression levels), model systems, and brain areas or tasks with more complex or higher-dimensional dynamics. Potential applications include, but are not limited to, brain-machine interfaces that incorporate neural network-based dynamics models into closed-loop, real time systems; hardware implementations of intermittent sampling for electrophysiology, etc. Such technologies can change the point at which intermittent sampling is beneficial from a power or performance perspective and can indicate new directions for future generations of recording hardware that focus on high interface capacities and rapid switching between contacts. Results shown by the present disclosure can potentially pave the way to substantially decrease power consumption for fully-implantable brain-machine interfaces, which should result in more reliable and less burdensome assistive devices for people with disabilities. Further, expanding the information that can be gathered through a given recording bandwidth has scientific implications and can enable neuroscientists to ask new questions via larger-scale studies of the brain.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the principles of the disclosure. All such modifications and variations are intended to be included herein within the scope of this disclosure and protected by the following claims.

The invention claimed is:

1. A system for training a recurrent neural network model, the system comprising:

at least one computer processor; and at least one non-transitory computer-readable storage medium storing instructions that, when executed by the at least one computer processor, causes the at least one computer processor to perform:

obtaining a first sequence of sparse input data as training data;

augmenting the first sequence of sparse input data by zero-filling missing input points;

training the recurrent neural network model using the augmented sequence of sparse input data to obtain a trained recurrent neural network model, the training including updating values of a plurality of parameters of the recurrent neural network model via a selective backpropagation through time process that computes a reconstruction loss only for each observed data point in the first sequence of sparse input data, wherein the recurrent neural network model learns latent dynamics underlying the first sequence of sparse input data; and applying new data that includes a second sequence of sparse input data as an input to the trained recurrent neural network model to generate a corresponding output data sequence by reconstructing data points of the second sequence of sparse input data corresponding to the observed data points and interpolating the output data sequence at each unobserved data point of the second sequence of sparse input data using the latent dynamics learned by the trained recurrent neural network model.

2. The system of claim 1, wherein the selective backpropagation through time process bypasses computing the reconstruction loss for the missing input points in the first sequence of sparse input data.

3. The system of claim 1, wherein the instructions further cause the at least one computer processor to pretrain the recurrent neural network model with input data that is not missing input points.

4. The system of claim 1, wherein the first sequence of sparse input data and the second sequence of sparse input data comprise staggered samplings of data.

5. The system of claim 1, wherein the first sequence of sparse input data comprises 2-photon (2P) calcium imaging data.

6. The system of claim 1, wherein the first sequence of sparse input data comprises electrophysiological recording data.

7. The system of claim 1, wherein the first sequence of sparse input data comprises data from a scanning or temporally multiplexing sampling process.

8. A method for training a recurrent neural network model, the method comprising:

obtaining, by at least one computer processor, a first sequence of sparse input data as training data;

augmenting, by the at least one computer processor, the first sequence of sparse input data by zero-filling missing input points;

training, by the at least one computer processor, the recurrent neural network model using the augmented sequence of sparse input data to obtain a trained recurrent neural network model, the training including updating values of a plurality of parameters of the recurrent neural network model via a selective backpropagation through time process that computes a reconstruction loss only for each observed data point in the first sequence of sparse input data, wherein the recurrent neural network model learns latent dynamics underlying the first sequence of sparse input data; and applying, by the at least one computer processor, new data that includes a second sequence of sparse data input as an input to the trained recurrent neural network model to generate a corresponding output data sequence by reconstructing data points of the second sequence of sparse input data corresponding to the observed data points and interpolating the output data sequence at each unobserved data point of the second sequence of sparse input data using the latent dynamics learned by the trained recurrent neural network model.

9. The method of claim 8, wherein the selective backpropagation through time process bypasses computing the reconstruction loss for the missing input points in the first sequence of sparse input data.

10. The method of claim 8, further comprising: pretraining the recurrent neural network model with input data that is not missing input points.

11. The method of claim 8, wherein the first sequence of sparse input data comprises 2-photon (2P) calcium imaging data, electrophysiological recording data, or other data from a scanning or temporally multiplexing sampling process.

12. At least one non-transitory computer-readable storage medium storing instructions that, when executed by at least one computer processor, cause the at least one computer processor to perform:

obtaining a first sequence of sparse input data as training data;

augmenting the first sequence of sparse input data by zero-filling missing input points;

training a recurrent neural network model using the augmented sequence of sparse input data to obtain a trained recurrent neural network model, the training includes updating values of a plurality of parameters of the recurrent neural network model via a selective backpropagation through time process that computes a reconstruction loss only for each observed data point in the first sequence of sparse input data, wherein the recurrent neural network model learns latent dynamics underlying the first sequence of sparse input data; and applying new data that includes a second sequence of sparse input data as an input to the trained recurrent neural network model, to generate a corresponding output data sequence by reconstructing data points of the second sequence of sparse input data corresponding to the observed data points and interpolating the output data sequence at each unobserved data point of the second sequence of sparse input data using the latent dynamics learned by the trained recurrent neural network model.

13. The at least one non-transitory computer-readable storage medium of claim 12, wherein the selective backpropagation through time bypasses computing the reconstruction loss for the missing input points in the first sequence of sparse input data.

14. The at least one non-transitory computer-readable storage medium of claim 12, wherein the instructions further cause the at least one computer processor to pretrain the recurrent neural network model with input data that is more densely sampled.

15. The system of claim 1, wherein the selective backpropagation through time process sets gradients corresponding to the missing input points to zero during backpropagation through time.

16. The system of claim 1, wherein the recurrent neural network model comprises a sequential variational autoencoder.

17. The method of claim 8, wherein the selective backpropagation through time process sets gradients corresponding to the missing input points to zero during backpropagation through time.

18. The method of claim 8, wherein the recurrent neural network model comprises a sequential variational autoencoder.

19. The at least one non-transitory computer-readable storage medium of claim 12, wherein the selective backpropagation through time process sets gradients corresponding to the missing input points to zero during backpropagation through time.

20. The at least one non-transitory computer-readable storage medium of claim 12, wherein the recurrent neural network model comprises a sequential variational autoencoder.

* * * * *